United States Patent
Lance

[19]

[11] Patent Number: 5,907,276
[45] Date of Patent: May 25, 1999

[54] VEHICLE RAMP SYSTEM

[76] Inventor: S. Richard Lance, 2989 Middle Rd., Columbia Falls, Mont. 59912

[21] Appl. No.: 08/865,790

[22] Filed: May 30, 1997

[51] Int. Cl.$^6$ .................................................... B60Q 1/00
[52] U.S. Cl. ........................ 340/425.5; 340/438; 296/61; 414/537; 14/71.1
[58] Field of Search ............................... 340/425.5, 433, 340/438, 488; 296/61; 414/537; 14/71.1

[56] References Cited

U.S. PATENT DOCUMENTS

| | | | |
|---|---|---|---|
| 4,020,957 | 5/1977 | Wren | 296/61 |
| 4,155,468 | 5/1979 | Royce | 340/472 |
| 4,906,041 | 3/1990 | McKenzie | 296/61 |
| 4,941,703 | 7/1990 | Curry | 296/50 |
| 4,944,546 | 7/1990 | Keller | 296/61 |
| 4,983,949 | 1/1991 | Wicker | 340/433 |
| 5,132,662 | 7/1992 | Burch | 340/433 |
| 5,281,948 | 1/1994 | Estrada | 340/433 |
| 5,312,149 | 5/1994 | Boone | 296/61 |
| 5,538,307 | 7/1996 | Otis | 296/61 |
| 5,540,474 | 7/1996 | Holland | 296/61 |
| 5,597,195 | 1/1997 | Meek | 296/61 |

*Primary Examiner*—Nina Tong
*Attorney, Agent, or Firm*—Matthews, Joseph, Shaddox & Mason, P.L.L.C.; Dwayne L. Mason

[57] ABSTRACT

A vehicle ramp system of the type connected to a vehicle and moveable from an extended ramp position to a retracted tailgate position is provided. The vehicle ramp system includes a ramp moveably connected to said vehicle, wherein said ramp may be moved from a ramp position, extending between the ground and said vehicle, and a tailgate position in which said ramp is retracted and connected to said vehicle; and an alarm system positioned and connected to said truck in a manner such that when said ramp is retracted and in the tailgate position said alarm is disengaged, and when said ramp is extended said alarm system is activated alerting an operator that said ramp is in the extended position. The ramp may be constructed as a single piece or preferable in sections. The ramp is to be constructed of a material such as carbon steel or stainless steel with dimensions capable of supporting equipment which may be loaded onto the vehicle on which the ramp is connected.

7 Claims, 2 Drawing Sheets

VEHICLE RAMP SYSTEM

TECHNICAL FIELD

The present invention relates to a ramp system for loading and unloading equipment and persons on and from a vehicle and more particularly to a combination ramp and tailgate system which includes an alarm to notify a driver of the vehicle that the ramp is extended when the vehicle is started.

BACKGROUND ART

Commonly pickup trucks and other trucks of various dimensions and configurations are used to transport equipment and people. While these vehicles are designed to transport equipment it is often difficult to load and unload equipment onto and from these vehicles. In particular, it is very difficult to load vehicles such as motorcycles, all terrain vehicles, mowers, jet skis and the like into the bed of common pickup trucks.

Heretofore, various vehicles were loaded into pickup trucks by lifting, which often requires more than one person and requires unnecessary use of energy and risk of injury. Additionally, it has been common in the past to use wood planks to form a ramp from the ground to the back of the truck. Obviously, the use of wood planks carries the risk of the plank(s) slipping or breaking under the load, thus increasing the probability of injury and damage to the equipment. The prior art also includes various foldable, and extendable ramp assemblies which are connectable to the tailgate of a truck. Some of these prior art devices require that the ramp be connected to the truck for loading and unloading then stored elsewhere when not in use. The prior art does not disclose a ramp assembly including an alarm to notify an operator of the vehicle that the ramp is in the extended position. It is not uncommon for an operator to unload or load a truck and leave the ramp in an extended position and then driving the vehicle. Moving the vehicle with the ramp in the extended position, especially when the vehicle is loaded, may result in losing the load, damage to the vehicle and/or ramp and injury to a person.

It would be a benefit, therefor, to have a ramp which is connected to the rear of a truck and extendable therefrom for loading and unloading the truck. It would be a further benefit to have a ramp which may be retracted from the extended ramp position and moved to a closed position in which the ramp serves as a tailgate of a truck. It would still be a further benefit to have a tailgate and ramp system wherein if the vehicle is started with the ramp extended an alarm will sound and wherein when the ramp is in the tailgate position the alarm will be disengaged.

GENERAL SUMMARY DISCUSSION OF INVENTION

It is thus an object of the invention to provide a vehicle ramp system that serves as a ramp for loading and unloading equipment and people onto and from a vehicle when extended.

It is a further object of the invention to provide a vehicle ramp system that serves as a tailgate when in the raised and locked position.

It is a still further object of the invention to provide a vehicle ramp system that includes an alarm system for alerting an operator when the ramp is in the extended position.

It is a still further object of the invention to provide a vehicle ramp system that is permanently connected to the vehicle and easy to operate.

Accordingly, a vehicle ramp system of the type connected to a vehicle and moveable from an extended ramp position to a retracted tailgate position is provided. The vehicle ramp system includes a ramp moveably connected to said vehicle, wherein said ramp may be moved from a ramp position, extending between the ground and said vehicle, and a tailgate position in which said ramp is retracted and connected to said vehicle; and an alarm system positioned and connected to said truck in a manner such that when said ramp is retracted and in the tailgate position said alarm is disengaged, and when said ramp is extended said alarm system is activated alerting an operator that said ramp is in the extended position.

The ramp may be constructed as a single piece or preferable in sections. The ramp is to be constructed of a material such as carbon steel or stainless steel with dimensions capable of supporting equipment which may be loaded onto the vehicle on which the ramp is connected. Other suitable materials of construction may be used such as high strength plastics, fiberglass and the like.

In a preferred embodiment the ramp includes a first section having a truck end hingedly connected to the vehicle and a second section hingedly connected to the first section. The first and second section are hingedly connected in a manner such that when extended the sections form a sturdy, unitary platform. The sections are further connected so that they may be folded and latched together and connected to the truck or vehicle to serve as a tailgate.

It may further be desired to include a third section to the ramp assembly. Preferably, this third section is slidably or telescopically connected to the second section so that when retracted and in the tailgate position the unit is compact and securable to the truck as a tailgate.

The ramp system of the invention further includes an alarm. The alarm is functionally connected to the ramp so that when the ramp is in the extended position an audio and/or visual alarm is activated indicating to the operator that the ramp is in the extended position. Preferably, the alarm system includes a switch which is connected to a speaker and or light via the vehicle's electrical system. When the ramp is in the raised or tailgate position the ramp contacts the switch and disengages the alarm system. When the ramp is in the extended position it does not engage the switch thus activating the alarm system. The alarm system may be wired so that an audio and/or visual signal is activated whenever the ramp is in the extended position. The alarm system may be wired so that the signals are only activated when the vehicle's ignition system is engaged and the ramp is extended. The alarm system may be connected to the vehicle's electrical system in a manner such that the vehicle may not be started when the ramp is in the extended position.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
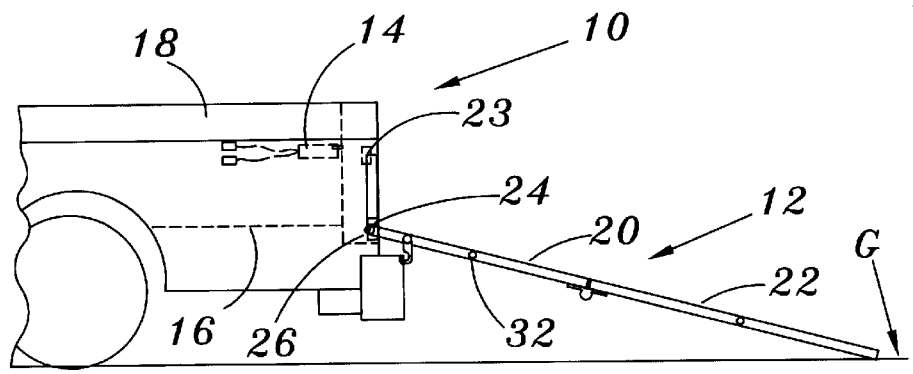
FIG. 1 is a side view of the truck ramp system of the present invention.

FIG. 1 is a side view of the truck ramp system of the present invention, generally designated by the numeral 10. Ramp system 10 includes a combination ramp and tailgate designated in whole by the numeral 12 and an alarm system 14.

Figure 2:
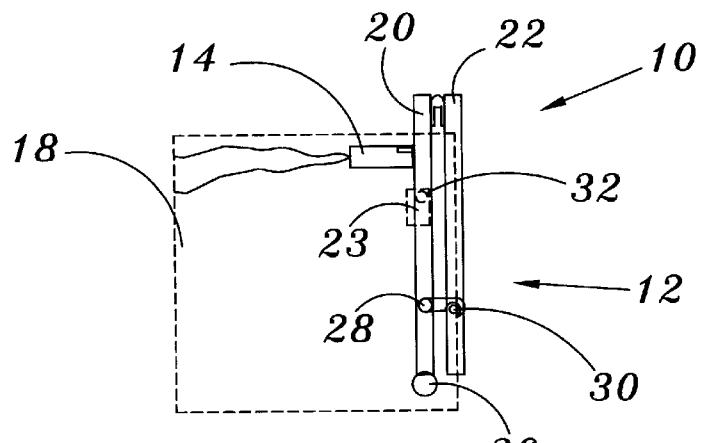
FIG. 2 is a side view of the truck ramp system in the folded tailgate position.

As shown in FIG. 1, combination tailgate and ramp 12 is shown in the ramp position extending outwardly from the bed 16 of a truck 18. Ramp 12 as shown in FIG. 1 includes a first section 20 and a second section 22. Sections 20 and 22 are constructed of a high strength metal or other such material so as to support the weight of equipment being loaded or unloaded from truck 18. First section 20 has a truck end 24 having a hinging member 26. Hinging member 26 is connected to truck 18 where a standard tailgate (not shown) would be connected so that ramp 12 in whole may be hingedly moved to a tailgate position as shown in FIG. 2. Second section 22 is hingedly connected to first section 20 at the end opposite truck end 24.

As shown in FIG. 1, ramp and tailgate section 12 is in the extended ramp position and positioned away from alarm system 14. In this position, alarm system 14 produces an audio alarm when truck 18 is started to indicate to an operator that ramp 12 is in the extended position. Alarm system 14 will be further described in reference to FIG. 3.

FIG. 2 is a side view of truck ramp system 10 in the folded tailgate position. As shown, ramp 12 is hingedly folded so that first section 20 and second section 22 are position parallel and adjacent to one another. Sections 20 and 22 are maintained in this position by a hook 28 movably connected to section 20 and connectable to pin 30 extending from a side of section 22. In the tailgate position of FIG. 2, ramp 12 is connected to truck 18 in a manner such as a standard tailgate using spring operated pins 32. Spring operated pins 32 are connected to the outer sides of ramp 12 and are urged outwardly so as to engage the retaining bracket 23 connected to truck 18 which is commonly used to lock a standard tailgate (not shown) in a closed position. In this position, tailgate/ramp 12 is in contact with alarm system 14, disengaging the audio and/or visual alarm signal.

Figure 3:
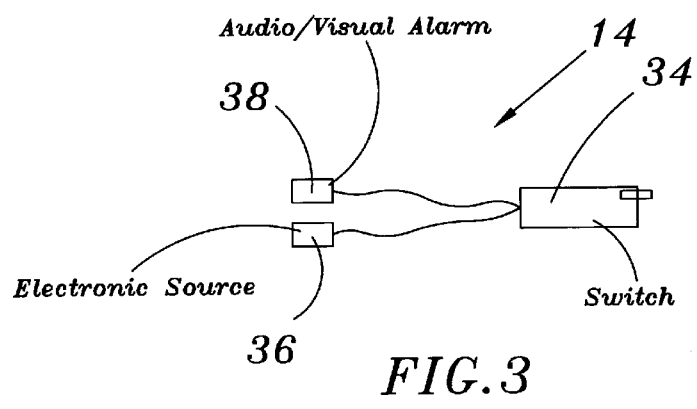
FIG. 3 is a schematic drawing of the alarm system.

FIG. 3 is a schematic drawing of alarm system 14. System 14 includes a switch 34 connected to an audio and/or visual alarm 38 via the trucks electrical source 36. With reference to FIGS. 1 through 3, when ramp 12 is in the extended position it is not in contact with switch 34, thereby activating alarm 38 notifying an operator that ramp 12 is down. Alarm system 14 may be connected via the ignition system of the truck so that alarm system 14 is not activated unless the ignition is turned on. As shown in FIG. 2, when ramp/tailgate 12 is in the tailgate position it is in contact with switch 34 thereby deactivating alarm 38. Alarm system 14 may be adapted so that when ramp 12 is in the extended position the vehicles ignition system is deactivated.

Figure 4:
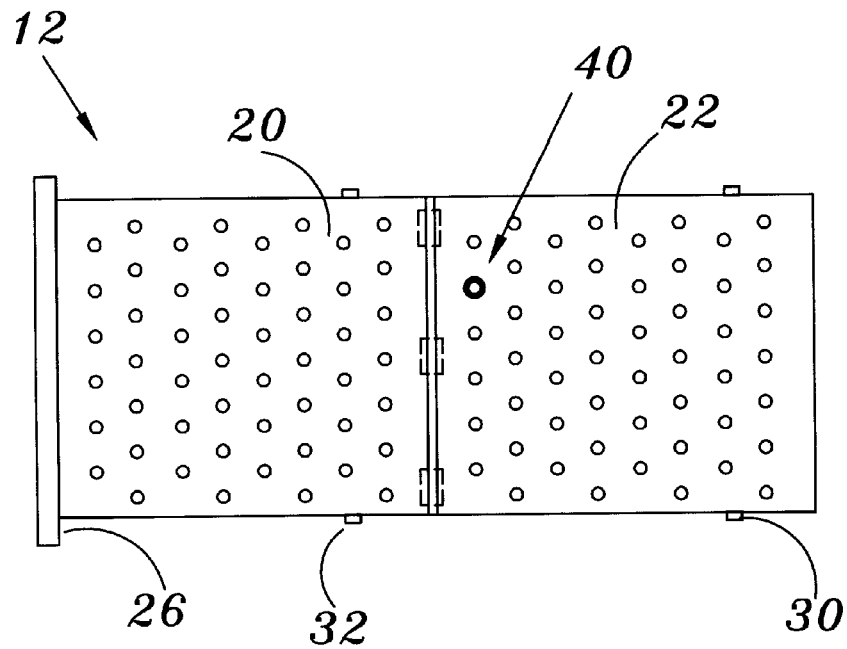
FIG. 4 is a top view of the ramp/tailgate in the extended position.

FIG. 4 is a top view of ramp/tailgate 12. Ramp 12 includes sections 20 and 22 which are hingedly connected to one another. Preferably, sections 20 and 22 have a plurality of holes 40 formed through them. Holes 40 reduce drag on truck 18 when ramp/tailgate 12 is in the raised position as shown in FIG. 2. In addition, holes 40 provide friction to aide in loading equipment when in the ramp position of FIG. 1.

Figure 5:
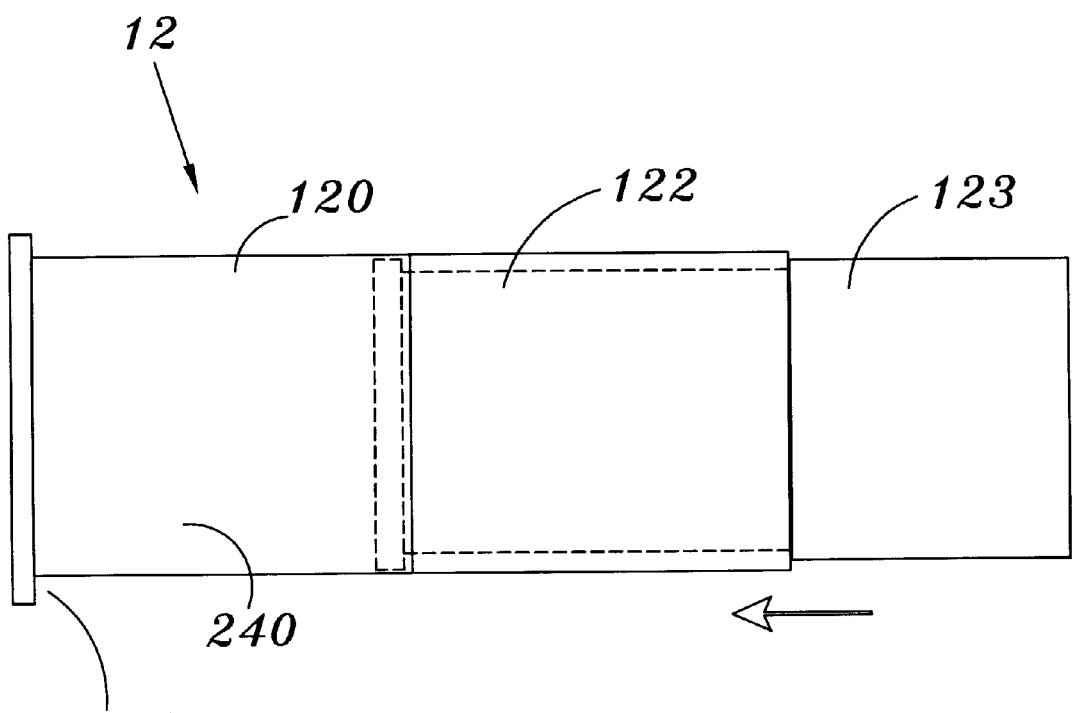
FIG. 5 is a top view of another embodiment of the ramp/tailgate.

FIG. 5 is a top view of another embodiment of ramp/tailgate 12 of FIGS. 1–4. Ramp/tailgate 12' of FIG. 5 includes a first section 120, a second section 122 and a third section 123. Ramp/tailgate 12' operates and functions essentially the same as ramp/tailgate 12 of FIGS. 1, 2 and 4 with the addition of third section 123. Ramp/tailgate 12' further operates in conjunction with alarm system 14 as shown in FIGS. 1–4. First section 120 of ramp 12' has a truck end 240 connected to a hinging member 260. Hinging member 260 is moveably connected in the sockets for a standard tailgate in truck 18 as shown in FIGS. 1 and 2. Section 122 is hingedly connected to first section 120 and preferably connected in a manner so that section 122 may be folded under and within section 120. Third section 123 is telescopically connected to section 122 in a manner such that section 123 may be retracted within section 122. This embodiment provides a more gradual incline for loading and unloading equipment from truck 18. In addition, this manner of retracting and moving ramp/tailgate 12' to the raised tailgate position, provides a more compact and aesthetic tailgate position.

It can be seen from the preceding description that a combination ramp and tailgate which may be extended from a vehicle for loading and unloading equipment and people onto and from a vehicle, serves as a tailgate when in the raised and locked position, includes an alarm system for alerting an operator when the ramp is in the extended position, and that is permanently connected to the vehicle and easy to operate has been provided.

It is noted that the embodiment of the vehicle ramp system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A vehicle ramp system for connecting to a flat bed or pickup truck comprising:

a ramp moveably connected to a vehicle, and having an adapter to connect to the end of a flat bed or pickup truck, wherein said ramp may be moved from a ramp position, extending between the ground and said vehicle, and a tailgate position in which said ramp is retracted and connected to said vehicle; and an alarm system positioned and connected to said vehicle in a manner such that when said ramp is retracted and in the tailgate position said alarm system is disengaged, and when said ramp is extended said alarm system is activated alerting an operator that said ramp is in an extended position;

wherein said ramp includes a first section having a truck end hingedly connected to said vehicle and a second section hingedly connected to said first section;

wherein said alarm system includes a speaker for audibly alerting the operator that said ramp is in the extended position; and said alarm system includes a visual mechanism for alerting the operator that said ramp is in the extended position when said alarm system is activated.

2. A vehicle ramp system comprising:

a ramp moveably connected to a vehicle, said ramp including a first section having a truck end hingedly connected to said vehicle and a second section hingedly connected to said first section, wherein said first section and said second section may be moved from a ramp position, extending between the ground and said vehicle, and a tailgate position in which said ramp is retracted and connected to said vehicle; and an alarm system positioned and connected to said vehicle in a manner such that when said ramp is retracted and in the tailgate position said alarm system is disengaged, and when said ramp is extended said alarm system is activated alerting an operator that said ramp is in an extended position;

wherein said ramp further includes a third section telescopically connected to said second section, in a manner such that said third section may be retracted within said second section for placement in said tailgate position, and may be extended from said second section when said ramp is in said extended position.

3. The vehicle ramp system of claim 2, wherein:

said alarm system includes a visual mechanism for alerting said operator that said ramp is in the extended position when said alarm system is activated.

4. The vehicle ramp system of claim 2, wherein:

said alarm system includes a speaker for audibly alerting said operator that said ramp is in the extended position.

5. The vehicle ramp system of claim 2, wherein:

said alarm system includes a speaker for audibly altering the operator that said ramp is in the extended position; and wherein said alarm system includes a visual mechanism for altering the operator that said ramp is in the extended position when said alarm system is activated.

6. A vehicle ramp system comprising:

a ramp moveably connected to a vehicle, said ramp including a first section having a truck end hingedly connected to said vehicle and a second section hingedly connected to said first section, wherein said first section and said second section may be moved from a ramp position, extending between the ground and said vehicle, and a tailgate position in which said ramp is retracted and connected to said vehicle; and an alarm system, including a switch connected via an electrical source to an audio alarm which is activated when said ramp is extended into the ramp position activating said alarm system notifying an operator that said ramp is extended and deactivating said alarm system when said ramp is positioned in the tailgate position and contacting said switch;

wherein said ramp further includes a third section telescopically connected to said second section, in a manner such that said third section may be retracted within said second section for placement in said tailgate position, and may be extended from said second section when said ramp is in said extended position.

7. The vehicle ramp system of claim 6, wherein:

said alarm system includes a visual mechanism for alerting said operator that said ramp is in the extended position when said alarm system is activated.

* * * * *